(12) United States Patent
Danley

(10) Patent No.: US 11,796,399 B2
(45) Date of Patent: Oct. 24, 2023

(54) MULTIPLE SAMPLE DIFFERENTIAL SCANNING CALORIMETER

(71) Applicant: Waters Technologies Corporation, Milford, MA (US)

(72) Inventor: Robert L. Danley, Collingswood, NJ (US)

(73) Assignee: WATERS TECHNOLOGIES CORPORATION, Milford, MA (US)

( * ) Notice: Subject to any disclaimer, the term of this patent is extended or adjusted under 35 U.S.C. 154(b) by 0 days.

(21) Appl. No.: 17/523,667

(22) Filed: Nov. 10, 2021

(65) Prior Publication Data

US 2022/0065711 A1    Mar. 3, 2022

Related U.S. Application Data

(63) Continuation of application No. 16/454,951, filed on Jun. 27, 2019, now Pat. No. 11,204,289.

(60) Provisional application No. 62/721,659, filed on Aug. 23, 2018.

(51) Int. Cl.
| G01K 17/00 | (2006.01) |
| G01K 19/00 | (2006.01) |
| G01K 7/02  | (2021.01) |

(52) U.S. Cl.
CPC ............... *G01K 17/00* (2013.01); *G01K 7/02* (2013.01); *G01K 19/00* (2013.01)

(58) Field of Classification Search
None
See application file for complete search history.

(56) References Cited

U.S. PATENT DOCUMENTS

| 4,350,446 A | 9/1982 | Johnson |
| 6,431,747 B1 | 8/2002 | Danley |
| 6,488,406 B2 | 12/2002 | Danley |
| 6,843,595 B2 | 1/2005 | Danley |
| 7,025,497 B2 | 4/2006 | Danley |
| 7,306,365 B2 | 12/2007 | Danley |
| 8,815,601 B2 | 8/2014 | Schenker |
| 2003/0072348 A1 | 4/2003 | Danley |
| 2003/0179806 A1 | 9/2003 | Danley |
| 2008/0052032 A1* | 2/2008 | Danley .............. G01N 25/4866 374/10 |
| 2015/0253206 A1 | 9/2015 | Danley |

FOREIGN PATENT DOCUMENTS

| EP | 0051266 A2 | 5/1982 |
| EP | 1342997 A1 | 9/2003 |

OTHER PUBLICATIONS

Non-Final Office Action in U.S. Appl. No. 17/102,487 dated Jan. 11, 2022.

(Continued)

*Primary Examiner* — Erica S Lin
(74) *Attorney, Agent, or Firm* — Schmeiser, Olsen & Watts LLP

(57) ABSTRACT

A heat flow rate measurement method for use with a differential scanning calorimeter sensor is provided. The method includes calculating a heat exchange between a plurality of sample containers and a reference container placed on a plurality of sample calorimeter units and a reference calorimeter unit, respectively, and determining a heat flow rate of samples within the sample containers using the calculated heat exchange between the plurality of sample containers and the reference container. A multiple sample differential scanning calorimeter sensor and calorimeter system are also provided.

14 Claims, 9 Drawing Sheets

(56) References Cited

OTHER PUBLICATIONS

International Search Report and Written Opinion in International Patent Application No. PCT/US2019/039474, dated Nov. 6, 2019; 14 pages.
Dallas, et al. "A new technology to improve DSC performance," American Laboratory, Aug. 2001, vol. 33, pp. 26-29.
International Preliminary Report on Patentability in International Patent Application No. PCT/US2019/039474, dated Mar. 4, 2021; 7 pages.
International Search Report and Written Opinion in International Patent Application No. PCT/US2020/061902, dated Mar. 17, 2021; 13 pages.
Notice of Allowance in U.S. Appl. No. 17/102,487 dated Aug. 12, 2022.
Restriction Requirement in U.S. Appl. No. 16/454,951, dated Feb. 5, 2021; 7 pages.
Non-Final Office Action in U.S. Appl. No. 16/454,951, dated Jun. 4, 2021; 8 pages.
Notice of Allowance in U.S. Appl. No. 16/454,951, dated Oct. 14, 2021; 8 pages.
International Preliminary Report on Patentability in PCT/US2020/061902 dated Jun. 30, 2022.
Non-Final Office Action in U.S. Appl. No. 17/102,487 dated Apr. 26, 2022.
Notice of Allowance in U.S. Appl. No. 17/102,487 dated Nov. 16, 2022.

* cited by examiner

MULTIPLE SAMPLE DIFFERENTIAL SCANNING CALORIMETER

CROSS REFERENCE TO RELATED APPLICATIONS

This application is a continuation of U.S. patent application Ser. No. 16/454,951 filed on Jun. 27, 2019 and titled, "MULTIPLE SAMPLE DIFFERENTIAL SCANNING CALORIMETER," which claims the benefit of and priority to U.S. Provisional Patent Application No. 62/721,659, filed Aug. 23, 2018, titled "MULTIPLE SAMPLE DIFFERENTIAL SCANNING CALORIMETER", the entireties of which are incorporated by reference herein.

FIELD OF TECHNOLOGY

The following relates to calorimetry, and more specifically to embodiments of a heat flow measurement method for use with a differential scanning calorimeter sensor.

BACKGROUND

Differential scanning calorimetry (DSC) is a type of dynamic calorimetry where the temperature of a sample under investigation and a reference are programmed to change with respect to time in a predetermined way. The change in temperature of the sample causes heat to flow to or from the sample. Conventional DSC instruments, such as a twin calorimeter, includes two essentially identical calorimeters (i.e. a sample calorimeter and a reference calorimeter) situated within a same controlled temperature calorimeter enclosure for measuring the heat flowing to and from the sample. The sample to be analyzed is placed in the sample container installed on the sample calorimeter and an inert reference sample is placed in the reference container installed on the reference calorimeter. In most instances, the reference container is empty. The heat flow rate to the sample and the sample's container is measured by the sample calorimeter and the heat flow rate to the reference sample, if used, and the reference container is measured by the reference calorimeter. The heat flow rate measured by the reference calorimeter is subtracted from the heat flow rate measured by the sample calorimeter to obtain the heat flow rate to the sample.

Conventional DSC instruments do not measure heat that is exchanged between the sample container and the calorimeter enclosure because this heat does not pass through the sample calorimeter. Further, the measured sample heat flow rate contains noise that is the result of unavoidable fluctuations of the temperature of the calorimeter enclosure. Given that the sample, the sample container, and the sample calorimeter are nearly identical to the reference sample, the reference container, and the reference calorimeter, the heat exchanged between each of the sample containers and the reference container and the calorimeter enclosure will be approximately the same and the noise in both the measured sample and reference heat flow rates will be approximately the same. As a result, when the measured reference heat flow rate is subtracted from the measured sample heat flow rate, the heat exchanged between the sample container and the calorimeter enclosure and the noise is almost entirely eliminated.

Most conventional DSC instruments measure sample heat flow rate by measuring a difference between the sample calorimeter temperature and reference calorimeter temperature, and dividing this temperature difference by a temperature dependent thermal resistance, which is shown by the equation: $q = -(T_s - T_r)/R(T_s)$, wherein q is the sample heat flow rate, $T_s$ is the sample calorimeter temperature, $T_r$ is the reference calorimeter temperature, and $R(T_s)$ is the temperature dependent thermal resistance. The sample heat flow rate equation, $q = -(T_s - T_r)/R(T_s)$, is based on assumptions and simplifications that are often violated in practice and as a result, the measured heat flow rate does not correspond to the true sample heat flow rate.

Furthermore, most conventional DSC instruments are limited to analyzing a single sample during an experiment. Experiments performed at low heating rates are often particularly lengthy, such as temperature modulating experiments carried out by conventional calorimeters having a single sample calorimeter and a single reference calorimeter. Sample throughput is improved by including an additional sample calorimeter within the calorimeter enclosure. However, conventional calorimeters outfitted with two or more sample calorimeters suffer from high levels of "crosstalk" and poor overall performance.

SUMMARY

A first aspect relates to a heat flow rate measurement method for use with a differential scanning calorimeter sensor, the method comprising calculating a heat exchange between a plurality of sample containers and a reference container placed on a plurality of sample calorimeter units and a reference calorimeter unit, respectively; and determining a heat flow rate of samples within the sample containers using the calculated heat exchange between the plurality of sample containers and the reference container.

In accordance with embodiments, the heat exchange between the sample containers and the reference container includes a sum of heat exchanges between the sample containers and the reference container for each calorimeter unit.

A second aspect relates to a multiple sample differential scanning calorimeter sensor comprising: a first sample calorimeter unit attached to a base and configured to receive a first sample container, a second sample calorimeter unit attached to the base and configured to receive a second sample container, a third sample calorimeter unit attached to the base and configured to receive a third sample container, wherein a distance between the first sample container on the first sample calorimeter unit and the second sample container on the second sample calorimeter unit is greater than a distance between the first sample container and the third sample container on the third sample calorimeter unit, and a reference calorimeter unit attached to the base and configured to receive a reference container, wherein heat exchanged between the first sample container, the second sample container, the third sample container, and the reference container is measured as a function of determining a heat flow measurement of heat flowing to and from a sample in the first sample container.

A third aspect relates to a calorimeter system comprising: a calorimeter sensor comprising a base, a plurality of sample calorimeter units attached to the base, each sample calorimeter unit configured to receive a sample container, and a reference calorimeter unit attached to the base, the reference calorimeter unit configured to receive a reference container; and a computing system in communication with the calorimeter sensor, wherein the computing system calculates a heat exchange between sample containers and reference container, and determines a heat flow rate of samples within the sample containers using the calculated heat exchange between the plurality of sample containers and the reference containers.

The foregoing and other features of construction and operation will be more readily understood and fully appreciated from the following detailed disclosure, taken in conjunction with accompanying drawings.

BRIEF DESCRIPTION OF THE DRAWINGS

Some of the embodiments will be described in detail, with reference to the following figures, wherein like designations denote like members, wherein.

DETAILED DESCRIPTION

Figure 1:
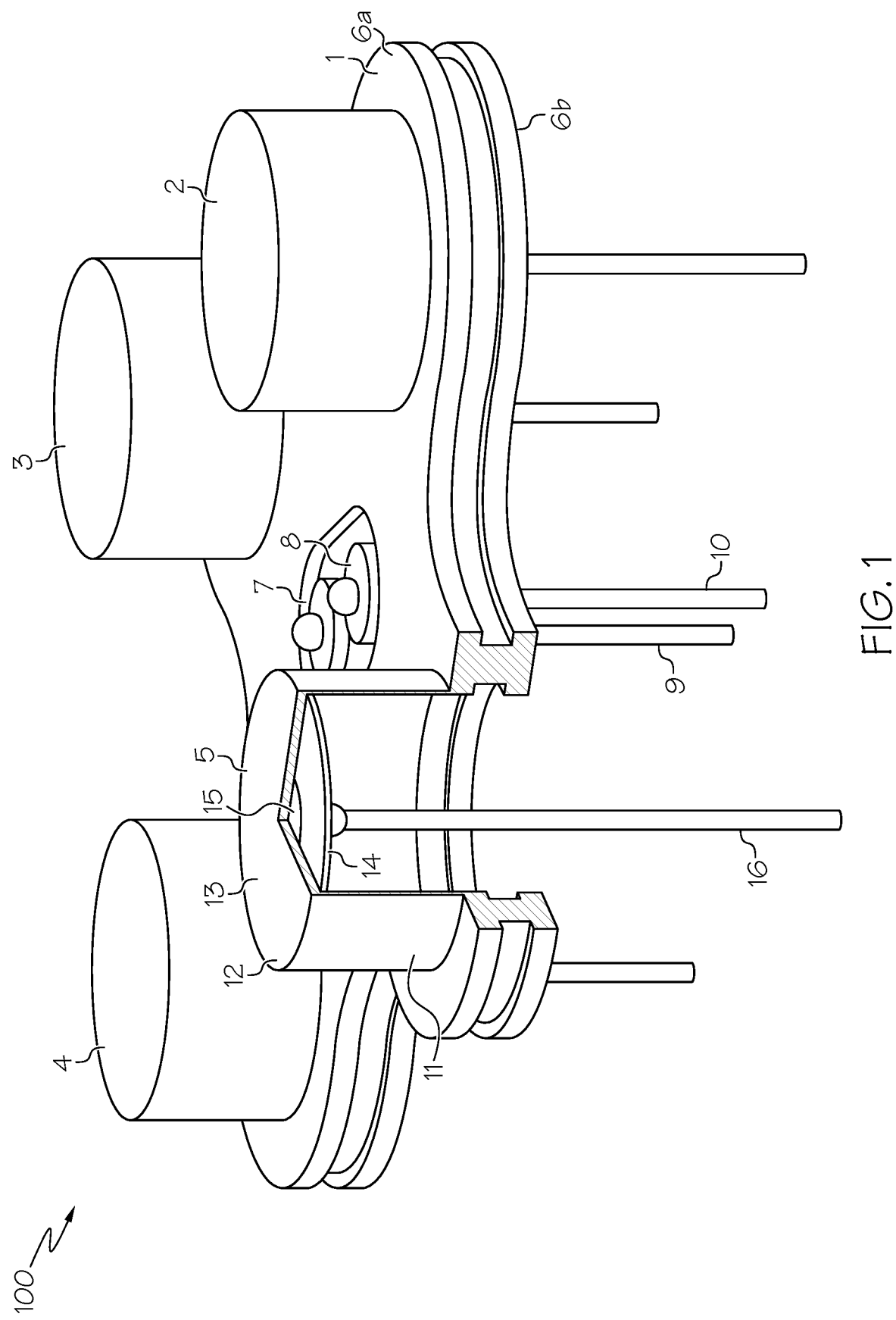
FIG. 1 is a schematic diagram of an embodiment of a multiple sample DSC sensor.

Reference in the specification to "one embodiment" or "an embodiment" means that a particular feature, structure or characteristic described in connection with the embodiment is included in at least one embodiment of the teaching. References to a particular embodiment within the specification do not necessarily all refer to the same embodiment. As used herein, the term "DSC" is an acronym for "differential scanning calorimeter."

In a conventional two sample DSC sensor (i.e. two sample calorimeters and one reference calorimeter), the calorimeter units are symmetrically positioned at apices of an equilateral triangle within a calorimeter enclosure, which means that the distance between each sample container placed atop the calorimeter units is identical. The heat that is exchanged between any pair of sample containers in this symmetric arrangement is compensated for when the heat flow from the reference calorimeter is subtracted from the heat flow to either of the sample calorimeters. When additional calorimeter units are added to the conventional two-sample DCS sensor to create a DSC sensor to analyze three or more samples, the symmetry between all of the sample containers is lost. As a result, crosstalk may appear in the measured sample heat flow rates. To reduce or eliminate such crosstalk, a heat balance equation is used to determine sample heat flow rates from the heat flow rate signals of the multiple sample calorimeter units and the reference calorimeter unit, which includes the heat transfer between the multiple sample containers and the reference container. Accordingly, embodiments disclosed herein are directed toward a multiple sample DSC sensor that reduces or eliminates crosstalk resulting from heat exchanged between each of the sample containers and the reference containers. The reduction and/or elimination of the crosstalk is accomplished by calculating a heat exchange between a plurality of sample containers and a reference container placed on a plurality of sample calorimeter units and a reference calorimeter unit, respectively, and then determining a heat flow rate of a sample within the sample containers using the calculated heat exchange between the plurality of sample containers and the reference container.

"Crosstalk" is described as the appearance of a feature on a DSC curve for one sample calorimeter caused by a thermal transition occurring at another sample calorimeter. Crosstalk occurs by two different and separate heat transfer paths. The first heat transfer path is by conduction of heat via the calorimetric sensor, and the second heat transfer path is heat exchange between the sample containers and the reference container by conduction and convection through the gas within the calorimetric enclosure and by radiation between the surfaces of the sample containers and the reference container. While crosstalk by the first heat transfer path through the calorimetric sensor is generally the greater concern, crosstalk by the second heat transfer path, directly between the sample containers and the reference container becomes significant as crosstalk via the first heat transfer path is made sufficiently small by conventional DSC sensor design and construction.

Existing heat flow measurement methods are employed in some embodiments of the multiple sample DSC sensor to determine the heat flow rates between the calorimeter units. One example of an existing heat flow measurement method (hereinafter referred to as the "conventional method" or "conventional heat flow measurement method") is disclosed in U.S. Pat. No. 6,431,747 to Danley, which is hereby incorporated by reference. In the conventional heat flow measurement method, which is different than the existing heat flow measurement discussed in the background section above, a single temperature, that of a base of the DSC sensor, and two temperature differences are measured: $\Delta T$, the difference between the sample calorimeter temperature and the reference calorimeter temperature; and $\Delta T_0$, the difference between the base temperature and the sample calorimeter temperature. The heat flow rate of the sample calorimeter, $\dot{q}s$, is measured using the conventional method according to the following equation:

$$\dot{q}s = (\Delta T_0/Rs) - Cs\dot{T}s, \qquad (\text{eq 1})$$

and the reference heat flow rate, $\dot{q}r$, is measured using the conventional method according to the following equation:

$$\dot{q}r = ((\Delta T_0 + \Delta T)/Rr) - Cr(\dot{T}s - \Delta \dot{T}) \qquad (\text{eq 2})$$

wherein Rs, Rr, Cs and Cr are thermal resistances and heat capacities of the sample and reference calorimeter and Ts, Tr, and $T_0$ are the temperatures of the sample and reference calorimeter units and the base, respectively.

Sample and reference calorimeter thermal resistances and heat capacities are determined by a two-step calibration procedure (described in detail in the '747 patent to Danley) where the DSC instrument performs two identical calibration experiments comprising a low temperature isothermal segment followed by a constant heating rate segment followed by a high temperature isothermal segment where the temperature range of the calibration experiment is equal to or greater than the temperature range of subsequent experiments. The first experiment is performed with the calorimeter empty (e.g. no sample or reference and no sample or reference containers). The second experiment is performed with calibration samples only, no sample containers on the sample and reference calorimeters where the calibration samples are inert and whose heat capacity is accurately known and whose mass is accurately known. Typically, the calibration samples are sapphire disks having a mass of about 100 mg.

Moreover, the sample heat flow rate is determined by taking the difference between the sample and reference calorimeter heat flow rates measured using (eq 1) and (eq 2), giving a four-term heat flow rate equation, q:

$$\dot{q} = \Delta T_0 (1/Rs - 1/Rr) - \Delta T/Rr + \dot{T}s(Cr - Cs) - \Delta \dot{T}Cr \quad \text{(eq 3)}$$

Now, a heat balance is performed on the sample container and the reference container and eliminating the specific heat capacity of the sample container from the sample container heat balance equation gives a new heat flow rate measurement method that includes the difference in heating rate between the sample containers in the measured sample heat flow rate according to the following equation:

$$\dot{q} = \dot{q}s - \dot{q}r(m_{ps}/m_{pr} * \dot{T}_{ps}/\dot{T}_{pr}) \quad \text{(eq 4)}$$

wherein, $m_{ps}$ and $m_{pr}$ are the sample and reference container masses and $\dot{T}_{ps}$ and $\dot{T}_{pr}$ are the derivatives of sample and reference container temperatures with respect to time. Sample and reference container temperatures are determined using the following equations:

$$T_{ps} = T_s - \dot{q}s R_{ps} \quad \text{(eq 5)}$$

$$T_{pr} = T_r - \dot{q}r R_{pr} \quad \text{(eq 6)}$$

wherein, Rps and Rpr are the contact thermal resistances between the sample container and sample calorimeter and between the reference container and reference calorimeter. The sample and reference calorimeter temperatures are found from the equations defining $\Delta T$ and $\Delta T_0$:

$$Ts = T_0 - \Delta T_0 \quad \text{(eq 7)}$$

$$Tr = Ts - \Delta T \quad \text{(eq 8)}$$

While $T_0$, $\Delta T$ and $\Delta T_0$ are used in preferred embodiments, any of three possible temperatures: $T_0$, Ts and Tr may be used for the temperature measurement and any two of three possible temperature differences: Ts–Tr, $T_0$–Ts, and $T_0$–Tr may be used for the two temperature difference measurements. Thus, there are at least nine possible combinations of one temperature and two temperature differences that may be used.

Further, additional calorimeters may be added to the DSC sensor by expanding the area of the base and adding additional calorimeter units. The new heat flow measurement method can be applied to the additional calorimeter units to account for the heat exchange between the sample containers and the reference container for reducing crosstalk.

The present teaching will now be described in more detail with reference to embodiments thereof as shown in the accompanying drawings. While the present teaching is described in conjunction with various embodiments and examples, it is not intended that the present teaching be limited to such embodiments. On the contrary, the present teaching encompasses various alternatives, modifications and equivalents, as will be appreciated by those of skill in the art. Those of ordinary skill having access to the teaching herein will recognize additional implementations, modifications and embodiments, as well as other fields of use, which are within the scope of the present disclosure.

FIG. 1 is a schematic diagram of an embodiment of a multiple sample DSC sensor 100. The sensor 100 includes four calorimeter units 2, 3, 4, 5 arranged on a base 1 for analyzing three samples and a single reference. Calorimeter units 3, 4, and 5 are sample calorimeter units receiving sample containers, and calorimeter unit 2 is a reference calorimeter unit receiving a reference container. The calorimeters units 2, 3, 4, 5 are symmetrically located with respect to a center of the base 1. However, each calorimeter unit is asymmetric with at least two other calorimeter units with respect to the base. By way of an example, calorimeter unit 3 is further away from calorimeter unit 5 than from calorimeter unit 4. The disparate distances between the sample containers placed on the calorimeter units 2, 3, 4, 5 results in crosstalk due to the heat exchange between the sample containers placed on the calorimeter units 2, 3, 4, 5.

The structural configuration of the calorimeter units is described herein with reference to calorimeter unit 5, which is shown in a cutaway view to illustrate the features of the calorimeter units; calorimeter units 2, 3, 4 have an identical structural configuration to calorimeter unit 5, and can be manufactured identically so that the thermal characteristics of the calorimeter units 2, 3, 4, 5 are well-matched. In some embodiments, slight differences between the calorimeter units 2, 3, 4, 5 are present due to imprecisions in the manufacturing processes. The calibration method described above accounts for these differences. Calorimeter unit 5 includes a tube 11 having a thickness between 0.002 inches and 0.010 inches that is contiguous (e.g. structurally integral) with the base 1. In a preferred embodiment, the thickness of the tube 11 is 0.005 inches. The tube 11 includes platform 12, which forms a top surface of the tube 11. The platform 12 is a flat disk contiguous (e.g. structurally integral) with the tube 11, having a flat surface 13 that receives a sample container. The tube 11 provides a thermal resistance to heat flow through the calorimeter unit 5, which creates a temperature difference that is measured during an experiment.

Furthermore, calorimeter 5 includes a sample area temperature detector 14 connected to the platform 12. The detector 14 is a disk concentrically attached to an underside of the platform 12 that is opposite to the flat surface 13 of the platform 12 that receives the sample container. The detector 14 is comprised of type E+ chromel alloy that has an opposite polarity than a thermocouple material comprising the platform 12, the tube 11, and the base 1. The base 1, the tube 11, and the platform 12 are made of type E− constantan thermocouple alloy and forms the negative element of the differential temperature thermocouple. The contact between the detector 14 and the platform 12 forms a sample area thermocouple for measuring a temperature difference between the sample calorimeter unit and the base 1.

A leadwire 16 comprised of the same thermocouple material as the detector 14 is welded to the detector 14. As shown, the leadwire 16 is welded to a central portion 15 of the detector 14 that is concentric with the detector 14 and protrudes from the disk 14 in a direction opposite the platform 12. The detector 14 is welded to the underside of the platform 12 at sixteen equally spaced positions in a circular pattern concentric to the detector 14 and the platform 12, thus forming sixteen thermoelectric junctions in parallel between the platform 12 and the detector 14.

A reference area temperature detector (not shown) is connected to the platform of calorimeter unit 2 (i.e. reference calorimeter unit). Similar to the detector 14, the reference area temperature detector is a disk concentrically attached to an underside of a platform associated with calorimeter unit 2; the detector is made of type E+ chromel alloy and has an opposite polarity than a thermocouple material comprising the platform, the tube, and the base 1. The contact between the reference area detector and the platform 12 forms a reference area thermocouple for measuring a temperature difference between the reference calorimeter unit and the base 1. A leadwire comprised of the same thermocouple material is welded to the reference area temperature detector in the same manner as the detector 14. The reference area temperature detector is welded to the underside of a platform at sixteen equally spaced positions in a circular pattern, thus forming sixteen thermoelectric junctions in parallel between the platform and the reference area temperature detector. Accordingly, the DSC sensor 100 includes three sample area thermocouples and a reference area thermocouple for temperature measurement.

Moreover, the base 1 is a heat source or a heat sink for heat flowing to or from the calorimeter units 2, 3, 4, 5. For example, when the DSC sensor 100 is heating, nearly all of the heat flowing to the calorimeter units 2, 3, 4, 5 flows from the base 1 whose temperature is higher than the calorimeter unit temperatures. Conversely, when the DSC sensor 100 is cooling, nearly all of the heat flowing from the calorimeter units 2, 3, 4, 5 flows to the base 1 whose temperature is lower than the temperature of the calorimeter units 2, 3, 4, 5. Thus, the base 1 forms a thermodynamic barrier to the flow of heat between calorimeter units 2, 3, 4, 5 by heat conduction through the DSC sensor 100. The base 1 includes a top surface 6a and a bottom surface 6b. The bottom surface 6b is a flat surface that facilitates mounting the DSC sensor 100 to a calorimeter enclosure not shown in FIG. 1. The calorimeter enclosure encloses the calorimeter units 2, 3, 4, 5 within the same temperature environment. The DSC sensor 100 is mounted to the calorimeter enclosure by brazing. Joining the DSC sensor 100 to the calorimeter enclosure by brazing ensures that heat exchange between the calorimeter units 2, 3, 4, 5 and other internal components and the calorimeter enclosure is uniform and repeatable, and also that a temperature of the base 1 is close to that of the calorimeter enclosure.

The DSC sensor 100 further includes installation elements 7, 8. The installation elements 7, 8 are disposed at a central location on the base 1 to facilitate installation of a positive thermocouple wire 9 and a negative thermocouple wire 10 that form a base thermocouple for measuring a temperature of the base 1, To. The installation elements 7, 8 are each a disc shaped element having a generally axial opening therethrough to allow a portion of the wires 9, 10 to pass therethrough. One of the thermocouple wires 9, 10 forms one leg of the temperature difference measurements, as described in greater detail in FIG. 2.

Figure 2:
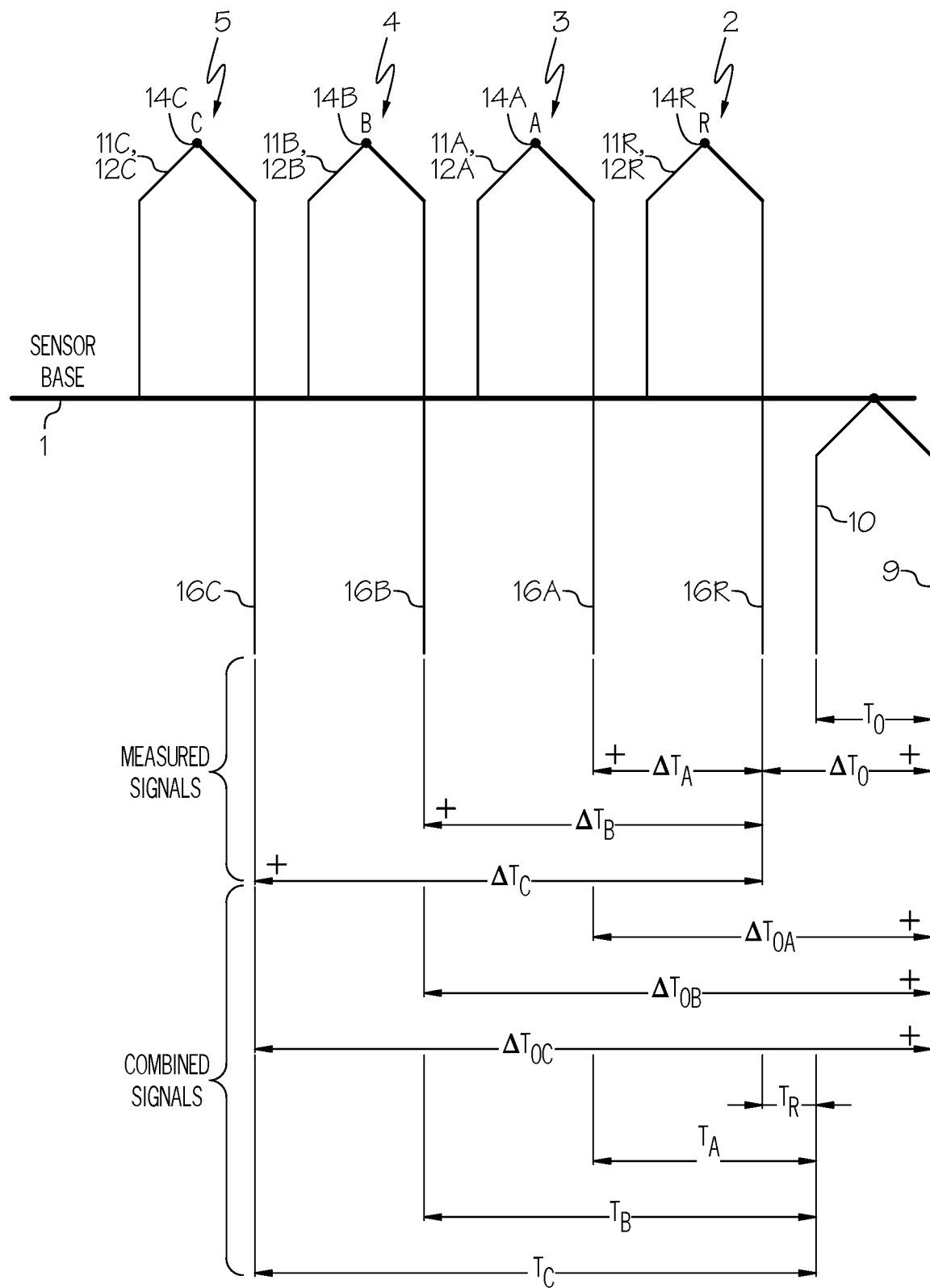
FIG. 2 is a thermocouple schematic of the DSC sensor of FIG. 1.

FIG. 2 is a thermocouple schematic of the DSC sensor 100 of FIG. 1. The calorimeter units 2, 3, 4, 5 have been additionally labelled R, A, B, and C, respectively, to indicate the three sample calorimeter units (i.e. A, B, C) and the reference calorimeter unit (i.e. R). Letters A, B, C and R appended to the reference numerals distinguish numerals pertaining to elements of individual calorimeters 2, 3, 4, 5, whereas these components were described above with respect to a single calorimeter unit (i.e. calorimeter unit 5) in FIG. 1. Four temperature differences are measured; $\Delta T_0$ is determined by measuring the voltage between the reference calorimeter area thermocouple and the base thermocouple, $\Delta T_A$, $\Delta T_B$ and $\Delta T_C$, are determined by measuring the voltage differences between each of the sample area thermocouples and the reference area thermocouple. Temperature $T_0$ is determined by measuring the voltage developed by the base thermocouple. Base 1 and tubes 11R, 11A, 11B, 11C and platforms 12R, 12A, 12B, 12C are the negative elements of the thermocouples used with the temperature difference measurements $\Delta T_0$, $\Delta T_A$, $\Delta T_B$ and $\Delta T_C$. Detectors 14R, 14A, 14B, 14C and leadwires 16R, 16A, 16B, 16C are the positive elements of the thermocouples used with the temperature difference measurements $\Delta T_0$, $\Delta T_A$, $\Delta T_B$ and $\Delta T_C$. Positive thermocouple wire 9 and negative thermocouple wire 10 form the base thermocouple attached to the base 1 that measures $T_0$. Temperature difference $\Delta T_0$ is measured between thermocouple wire 9 and leadwire 16R, temperature difference $\Delta T_A$ is measured between leadwires 16A and 16R, temperature difference $\Delta T_B$ is measured between leadwires 16B and 16R, and temperature difference $\Delta T_C$ is measured between leadwires 16C and 16R.

The values measured to obtain $\Delta T_0$, $\Delta T_A$, $\Delta T_B$ and $\Delta T_C$, and temperature $T_0$ are used to calculate $T_R$, $T_A$, $T_B$, and $T_C$ according to the following equations:

$$\Delta T_0 = T_0 - T_R \quad \text{(eq 9)}$$

$$\Delta T_A = T_A - T_R \quad \text{(eq 10)}$$

$$\Delta T_B = T_B - T_R \quad \text{(eq 11)}$$

$$\Delta T_C = T_C - T_R \quad \text{(eq 12)}$$

wherein $T_0$ is the measured temperature of the base 1, $T_R$ is the measured temperature of the reference calorimeter unit 2, $T_A$ is the measured temperature of the sample calorimeter unit 3, $T_B$ is the measured temperature of the sample calorimeter unit 4, and $T_C$ is the measured temperature of the sample calorimeter unit 5. The signals for $T_R$, $T_A$, $T_B$, and $T_C$ are considered combined signals because these values are not measured directly but are obtained by combining measured signals.

Additional temperature and temperature difference measurements are obtained by combining the electrical signals of measurements $\Delta T_0$, $\Delta T_A$, $\Delta T_B$ and $\Delta T_C$ according to the following equations:

$$\Delta T_{0A} \stackrel{\text{def}}{=} T_0 - T_A = \Delta T_0 - \Delta T_A \quad \text{(eq 13)}$$

$$\Delta T_{0B} \stackrel{\text{def}}{=} T_0 - T_B = \Delta T_0 - \Delta T_B \quad \text{(eq 14)}$$

$$\Delta T_{0C} \stackrel{\text{def}}{=} T_0 - T_C = \Delta T_0 - \Delta T_C \quad \text{(eq 15)}$$

$$T_R = T_0 - \Delta T_0 \quad \text{(eq 16)}$$

$$T_A = T_0 - \Delta T_{0A} \quad \text{(eq 17)}$$

$$T_B = T_0 - \Delta T_{0B} \quad \text{(eq 18)}$$

$$T_C = T_0 - \Delta T_{0C} \quad \text{(eq 18)}$$

wherein $\Delta T_{0A}$ is a temperature difference between base 1 and calorimeter unit 3, $\Delta T_{0B}$ is a temperature difference between base 1 and calorimeter unit 4, and $\Delta T_{0C}$ is a temperature difference between base 1 and calorimeter unit 5. The combination of a single temperature measurement and four temperature difference measurements may not be exclusive, and many other combinations of a single temperature measurement and four temperature difference measurements may be used to implement embodiments of the present invention, which may be analogous to the nine combinations of a single temperature measurement and two temperature difference measurements according to the conventional heat flow measurement method.

Figure 3:
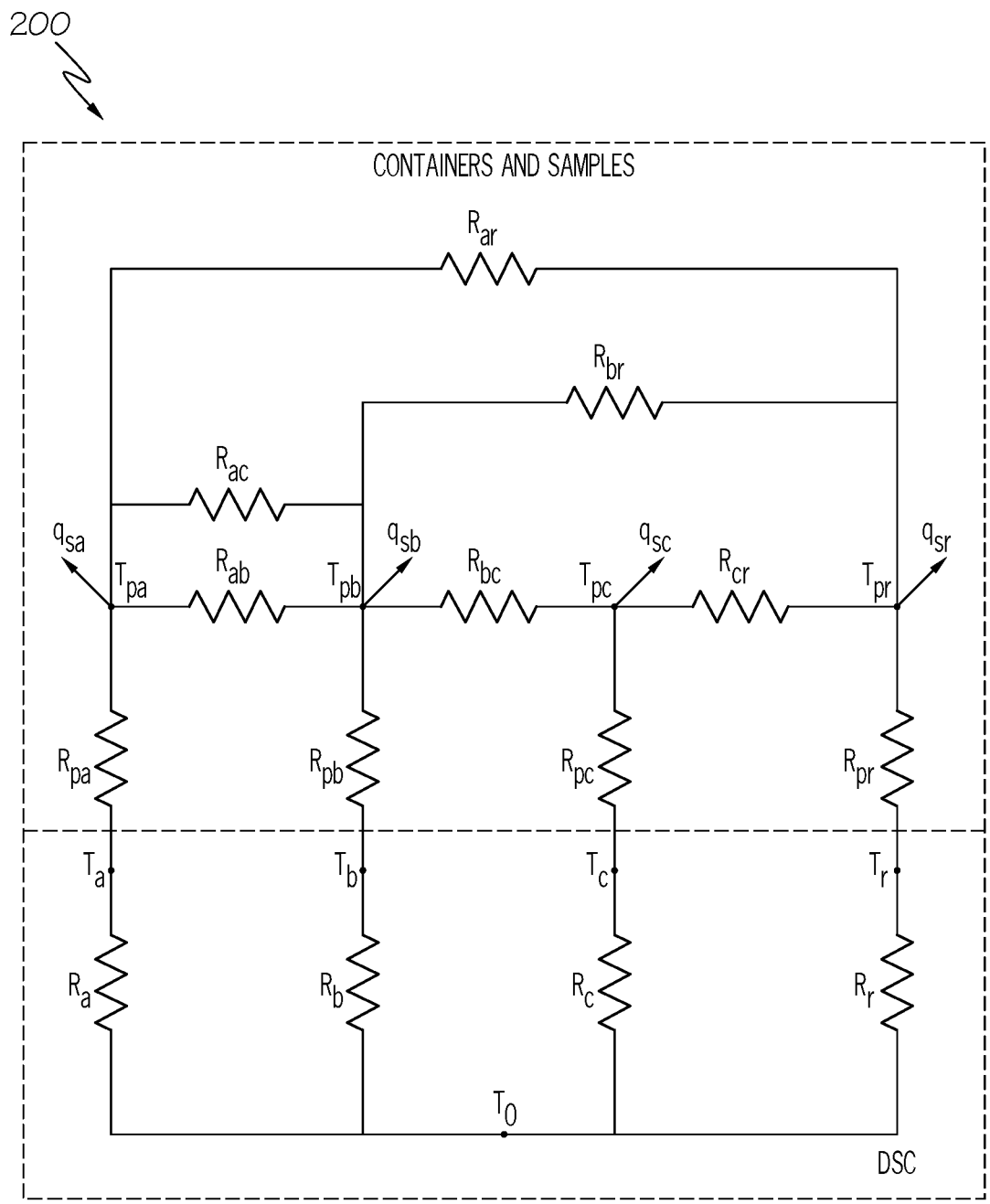
FIG. 3 is a thermal network model of the DSC sensor of FIG. 1.

FIG. 3 is a thermal network model 200 of the DSC sensor 100. Thermal network model 200 shows how the heat flow rate measurements are made. Model elements include nodes that represent temperatures, thermal resistances, and heat capacities. Thermal resistances represent heat flow elements where the heat flows through the thermal resistance according to the following equation:

$$\dot{q}=(T_x-T_y)/R \qquad (eq\ 20)$$

wherein $T_x$ and $T_y$ are temperatures at the terminals of the thermal resistance, R (° C./W). Heat capacities represent heat storage elements where the rate of heat storage is described by the following equation:

$$\dot{q}=C\dot{T}, \qquad (eq\ 21)$$

wherein C is the heat capacity (J/° C.) and $\dot{T}$ is the rate of change of temperature of the heat capacity with respect to time. The heat capacities are not explicitly shown in the thermal network model 200 but are connected to the calorimeter unit and the sample container temperature nodes and the reference container temperature node. In the thermal model 200, $T_0$ represents the temperature of the base 1 and is controlled to follow the desired temperature trajectory of the experiment by a temperature control module coupled to a computing system. $T_0$ is measured between thermocouple wires 9 and 10 attached to base 1 (see FIG. 1). Thus, the temperature control module activates a heater to regulate the DSC enclosure temperature which causes heat to flow through the thermal resistances depicted in the network model 200 to the samples within the sample containers and to be stored in the heat capacities. The temperature control module may also activate a cooling device attached to the DSC sensor 100 to enable operation below ambient temperature. The cooling device improves cooling rates and temperature control when the desired temperature trajectory includes cooling the samples.

Ta, Tb, TC and Tr are the A, B, C and R calorimeter unit temperatures, respectively, which are measured by the thermocouples formed by the junctions between detectors 14A, 14B, 14C, 14R and platforms 12A, 12B, 12C, and 12R. Temperatures $T_{PA}$, $T_{PB}$, $T_{PC}$ and $T_{PR}$ are the A, B, C and R sample and reference container temperatures. Thermal resistances $R_A$, $R_B$, $R_C$ and RR are the A, B, C and R calorimeter thermal resistances, which are embodied principally by the tubes 11A, 11B, 11C, and 11R, respectively. $C_A$, $C_B$, $C_C$ and $C_R$ (not shown) are A, B, C and R calorimeter heat capacities, which are connected to the calorimeter temperature nodes. Because each component of the DSC sensor 100 has the ability to store heat as heat flows through the DSC sensor 100, the heat capacities within thermal network model 200 are embodied by the platforms 12A, 12B, 12C, 12R, the detectors 14A, 14B, 14C, 14R, portions of the tubes 11A, 11B, 11C, 11R, and portions of the positive thermocouple leadwires 16A, 16B, 16C, 16R. $R_{PA}$, $R_{PB}$, $R_{PC}$ and $R_{PR}$ represent thermal contact resistances between calorimeter units A, B, C and R and respective sample and reference containers associated with calorimeter units A, B, C and R. $C_{PA}$, $C_{PB}$, $C_{PC}$ and CPR are the heat capacities of the sample and reference containers associated with calorimeter units A, B, C and R. $R_{AB}$, $R_{AC}$, $R_{AR}$, $R_{BC}$, $R_{BR}$ and $R_{CR}$ represent thermal resistances between the sample containers. Heat exchange between sample containers represented by these interpan thermal resistances $R_{AB}$, $R_{AC}$, $R_{AR}$, $R_{BC}$, $R_{BR}$ and $R_{CR}$ is a combination of heat conduction through the gas in the calorimetric enclosure and radiation between sample and reference container surfaces. The interpan thermal resistances $R_{AB}$, $R_{AC}$, $R_{AR}$, $R_{BC}$, $R_{BR}$ and $R_{CR}$ also include convection by the gas; however, based on the configuration of the DSC sensor 100, there is no contribution to the heat exchange by convection. The DSC sensor 100 determines the heat flowing to and from samples in the sample containers associated with calorimeter units 3, 4, 5, which are represented by $q_{sa}$, $q_{sb}$ and $q_{sc}$ in the thermal network model 200. The DSC sensor 100 is represented by a part of the thermal network model 200 below the horizontal dot-dash line.

A heat balance is performed on each of the calorimeter temperature nodes to get the heat flow rate measurement equations for the four calorimeter units A, B, C, and R. The equations are as follows:

$$\dot{q}_A=(\Delta T_{0A}/R_A)-C_A\dot{T}_A \qquad (eq\ 22)$$

$$\dot{q}_B=(\Delta T_{0B}/R_B)-C_B\dot{T}_B \qquad (eq\ 23)$$

$$\dot{q}_C=(\Delta T_{0C}/R_C)-C_C\dot{T}_C \qquad (eq\ 24)$$

$$\dot{q}_R=(\Delta T_{0R}/R_R)-C_R\dot{T}_R \qquad (eq\ 25)$$

The heat flow rates measured by the four calorimeter units are equal to the heat flowing through the contact resistances $R_{PA}$, $R_{PB}$, $R_{PC}$ and $R_{PR}$ between the calorimeters and the sample containers:

$$q_A(T_A-T_{PA})/R_{PA} \qquad (eq\ 26)$$

$$q_B(T_B-T_{PB})/R_{PB} \qquad (eq\ 27)$$

$$q_C(T_C-T_{PC})/R_{PC} \qquad (eq\ 28)$$

$$q_R(T_R-T_{PR})/R_{PR} \qquad (eq\ 29)$$

Another heat balance is performed for the sample container associated with calorimeter unit A, which gives the following equation:

$$\dot{q}_{SA}=\dot{q}_A+((T_{PB}-T_{PA})/R_{AB})+((T_{PC}-T_{PA})/R_{AC})+((T_{PR}-T_{PA})/R_{AR})-C_{PA}\dot{T}_{PA} \qquad (eq\ 30)$$

Performing a heat balance on the reference container associated with the reference calorimeter unit B and noting that, $\dot{q}_{SR}=0$ because the reference container is empty gives the following equation:

$$C_{PR}\dot{T}_{PR}=\dot{q}_R+((T_{PA}-T_{PR})/R_{AR})+((T_{PB}-T_{PR})/R_{BR})+((T_{PR}-T_{PA})/R_{BR})+((T_{PC}-T_{PR})/R_{CR}) \qquad (eq\ 31)$$

The product of a container mass and a container material specific heat capacity is substituted for $C_{PA}$ and $C_{PR}$. The container material specific heat is eliminated from the sample container heat balance equation by solving the reference container heat balance equation for container specific heat capacity and substituting it for the container specific heat capacity in the sample container heat balance equation. A sum of the heat exchanges between sample containers for sample containers A and R, respectively, is designated by the following equations:

$$\dot{q}_{PA}=((T_{PB}-T_{PA})/R_{AB})+((T_{PC}-T_{PA})/R_{AC})+((T_{PR}-T_{PA})/R_{AR}) \qquad (eq\ 32)$$

$$\dot{q}_{PR}=((T_{PA}-T_{PR})/R_{AR})+((T_{PB}-T_{PR})/R_{BR})+((T_{PC}-T_{PR})/R_{CR}) \qquad (eq\ 33)$$

Therefore, the equation for calculating the heat flow rate of the sample associated with calorimeter unit A, $\dot{q}_{SA}$, then becomes:

$$\dot{q}_{SA}=\dot{q}_A+\dot{q}_{PA}-((m_{PA}\dot{T}_{PA})/(m_{PR}\dot{T}_{PR}))*(\dot{q}_R+\dot{q}_{PR}) \qquad (eq\ 34)$$

The equation for $\dot{q}_{SA}$ is different from the equations used in the conventional heat flow measurement because it includes $\dot{q}_{PA}$, the heat exchanged between sample container associated with calorimeter unit A and the other three sample containers, and $\dot{q}_{PR}$, the heat exchange between sample container associated with the reference calorimeter unit R and the other three sample containers. The new methods and equations described herein confer the same performance advantages using the conventional heat flow measurement method, but also reduces crosstalk because it includes the heat exchange between the sample containers and the reference container, which is a main source of crosstalk given that the calorimeter units are independent and crosstalk by conduction through the DSC sensor 100 is essentially eliminated.

Similar equations are written for sample containers associated with calorimeter units B and C, respectively, by replacing the A subscripts with B and C, as shown in the following equations:

$$\dot{q}_{SB} = \dot{q}_B + \dot{q}_{PB} - ((m_{PB}\dot{T}_{PB})/(m_{PR}\dot{T}_{PR}))^*(\dot{q}_R + \dot{q}_{PR}) \quad \text{(eq 35)}$$

$$\dot{q}_{SC} = \dot{q}_C + \dot{q}_{PC} - ((m_{PC}\dot{T}_{PC})/(m_{PR}\dot{T}_{PR}))^*(\dot{q}_R + \dot{q}_{PR}) \quad \text{(eq 36)}$$

The equations for $\dot{q}_{PB}$ and $\dot{q}_{PC}$ have a similar form to those for $\dot{q}_{PA}$ and $\dot{q}_{PR}$ and are written immediately by inspection as follows:

$$\dot{q}_{PB} = (T_{PA} - T_{PB})/R_{AB} + ((T_{PC} - T_{PB})/R_{BC}) + ((T_{PR} - T_{PB})/R_{BR}) \quad \text{(eq 37)}$$

$$\dot{q}_{PC} = (T_{PA} - T_{PC})/R_{AC} + ((T_{PB} - T_{PC})/R_{BC}) + ((T_{PR} - T_{PC})/R_{CR}) \quad \text{(eq 38)}$$

The above equations are used for calculating the heat flow rate of the samples associated with three sample calorimeter units (i.e. A, B, C) and the reference calorimeter unit (i.e. R). DSC sensors optionally include more than three sample calorimeter units. The interpan heat flow rates between the sample and reference containers with "n" number of sample calorimeter units is expressed as follows:

$$\dot{q}_{PA} = ((T_{PB} - T_{PA})/R_{AB}) + ((T_{PC} - T_{PA})/R_{AC}) + \ldots + (T_{Pn} - T_{PA})/(R_{An}) + ((T_{PR} - T_{PA})/R_{AR}); \quad \text{(eq 39)}$$

$$\dot{q}_{PB} = ((T_{PA} - T_{PB})/R_{AB}) + ((T_{PC} - T_{PB})/R_{BC}) + \ldots + ((T_{Pn} - T_{PB})/R_{Bn})((T_{PR} - T_{PB})/R_{BR}); \quad \text{(eq 40)}$$

$$\dot{q}_{PC} = ((T_{PA} - T_{PC})/R_{AC}) + ((T_{PB} - T_{PC})/R_{BC}) + \ldots + ((T_{Pn} - T_{PC})/R_{Cn}) + ((T_{PR} - T_{PC})/R_{BR}); \quad \text{(eq 41)}$$

and so on up to calorimeter n:

$$\dot{q}_{Pn} = ((T_{PA} - T_{Pn})/R_{An}) + ((T_{PB} - T_{Pn})/R_{Bn}) + \ldots ((T_{Pn-1} - T_{Pn})/R_{(n-1)n}) + ((T_{PR} - T_{Pn})/R_{nR}), \quad \text{(eq 42)}$$

wherein $T_{PA}$ is a temperature of a first sample container, $T_{PB}$ is a temperature of a second sample container, $R_{AB}$ is a thermal resistance between a first sample container and a second sample container, $T_{PC}$ is a temperature of a third sample container, $R_{AC}$ is a thermal resistance between the first sample container and a third sample container, $T_{Pn}$ is a temperature of a nth sample container, $R_{An}$ is a thermal resistance between the first sample container and the nth sample container, $T_{PR}$ is a temperature of the reference container, and $R_{AR}$ is a thermal resistance between the first sample container and the reference container. Any number of sample calorimeter units can be present, including sample calorimeter units A, B, C, and a plurality of additional sample calorimeter units up to the number n of sample calorimeter units, wherein the variable "n" represents the last sample calorimeter unit in a sequence of sample calorimeter units. The ellipses represent a variable number of individual terms for calculating the heat flowing through the interpan thermal resistances of each sample container between sample calorimeter C and sample calorimeter n. By way of an example, if a DSC sensor had five sample calorimeter units and a reference calorimeter unit, the interpan heat flow rate for the fifth sample container, subscript E would be expressed as follows:

$$\dot{q}_{PE} = ((T_{PA} - T_{PE})/R_{AE}) + ((T_{PB} - T_{PE})/R_{BE}) + ((T_{PC} - T_{PE})/R_{CE}) + ((T_{PD} - T_{PE})/R_{DE}) + ((T_{PR} - T_{PE})/R_{ER}), \quad \text{(eq 43)}$$

wherein $T_{PA}$ is a temperature of a first sample container, $T_{PE}$ is a temperature of a fifth sample container, RAE is a thermal resistance between the first sample container and the fifth sample container, $T_{PB}$ is a temperature of a second sample container, $R_{BE}$ is a thermal resistance between the second sample container and the fifth sample container, $T_{PC}$ is a temperature of a third sample container, $R_{CE}$ is a thermal resistance between the third sample container and the fifth sample container, $T_{PD}$ is a temperature of a fourth sample container, $R_{DE}$ is a thermal resistance between the fourth sample container and the fifth sample container, $T_{PR}$ is a temperature of the reference container, and $R_{ER}$ is a thermal resistance between the fifth sample container and the reference container.

An alternate and compact form of the equation used for calculating the interpan heat flow rate of the sample containers associated with a plurality of sample calorimeter units and the reference calorimeter unit is $\dot{q}_{pi}$. The alternate equation is for n number of sample containers on n number of sample calorimeter units with a reference container r on a reference calorimeter. The alternate equation is expressed as follows:

$$\dot{q}_{pi} = \frac{(T_{Pr} - T_{Pi})}{R_{ir}} + \sum_{j=1, j \neq i}^{n} \frac{(T_{pj} - T_{pi})}{R_{ji}} \quad \text{(eq 44)}$$

where: i=1, 2 ... n and j=1, 2 ... n.

To employ the heat flow rate measurement equations, values of the thermal resistances between the sample and reference containers should be available for use in the heat flow rate computations. The heat exchange between the sample and reference containers is by parallel heat conduction through the gas within the calorimeter enclosure and radiation between the containers. The heat exchange may further include gas convection; however, the configuration of the DSC sensor 100 essentially eliminates any contribution from convection. In total, there are six thermal resistances linking the four containers, four of which have the same nominal value for the four pairs of containers that are adjacent one another, the remaining two having the same nominal value for the two pairs of containers opposite one another at the opposite apices of the square array of calorimeters. The thermal resistances are temperature dependent and nonlinear because the thermal resistances depend on thermal conductivity of the gas within the calorimeter enclosure, which varies nonlinearly with temperature. Also, the thermal resistances are temperature dependent and nonlinear because radiation is included, and radiation heat exchange is proportional to the differences between fourth powers of the absolute temperatures of the sample containers, in addition to which, thermal emittance of the container surfaces varies nonlinearly with temperature.

Values of thermal resistances between containers may be determined experimentally where the value of thermal resistance that minimizes crosstalk is found using any suitable method, including curve fitting, minimization or optimization methods, and trial and error methods. Values of thermal resistances may also be found using numerical simulation methods. For example, Finite Element Analysis can be used to calculate the values of thermal resistance between containers. In some embodiments, a combination of experimentation and simulation can be used to determine appropriate thermal resistances. A magnitude of the thermal resistances is dependent on geometry, material properties of the heat transfer medium (i.e. gas in the calorimeter enclosure) and surface properties of the surfaces exchanging heat. Thus, different thermal resistances are required when different gases are used to purge the calorimeter enclosure, when sample containers with different geometry are used and when containers constructed of different materials are used.

Figure 4:
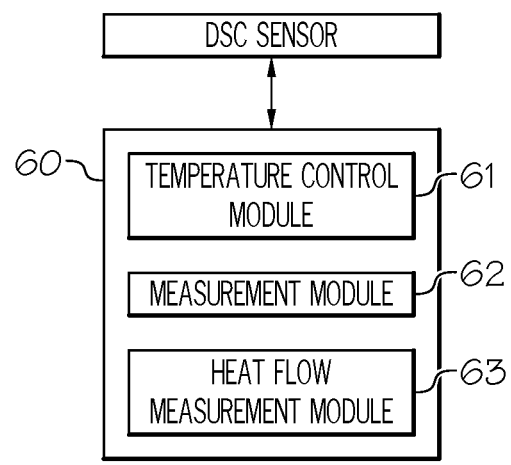
FIG. 4 is a functional block diagram of a DSC heat flow rate measurement system.

FIG. 4 is a schematic diagram of a DSC sensor in communication with a computing system 60. The computing system 60 has a processor for implementing the heat flow measurement methods according to embodiments described herein. The computing system 60 is a local, dedicated computer designed only to carry out the DSC experiment using the DSC sensor. Alternatively, the computing system 60 is a personal computer remotely coupled to the DSC sensor running various software applications unique to the DSC sensor. The computing system includes a temperature control module 61, a measurement module 62, and a heat flow measurement module 63. The modules 61, 62, 63 are a combination of one or more hardware-based modules and software-based modules. A hardware-based module typically includes self-contained components such as chipsets, specialized circuitry and one or more memory devices. A software-based module typically includes a program code or is linked to program code containing specific programmed instructions, and typically is loaded in the memory device of the control unit or computing system. The temperature control module 61 is configured to change and/or control a temperature of the base 1 according to a predetermined temperature program over time, according to known heat flux DSC methods. The change in temperature of the base 1 causes a temperature of the samples in the sample containers atop the calorimeter units to change, causing heat to flow to or from each sample. The measurement module 62 is configured to calculate temperature and temperature difference values from voltages measured from thermocouples of the DSC sensor. The thermocouples are in electrical communication with the computing system 60. The measurement module 62 communicates via analog-to-digital conversion circuits with amplifiers for amplifying the voltage signals measured from the thermocouples. The heat flow measurement module 63 is configured to calculate a heat exchange between the sample containers and the reference container placed on sample calorimeter units and a reference calorimeter unit, respectively, and to determine a heat flow rate of samples within the sample containers. The computing system 60 outputs a DSC data file that may be analyzed using a data analysis program. Typically, the data analysis program creates a graph showing heat flow rate versus temperature or time. An enthalpy of the sample is determined from a DSC curve output by the computing system, which additionally considers the heat exchanged between the containers.

Figure 5:
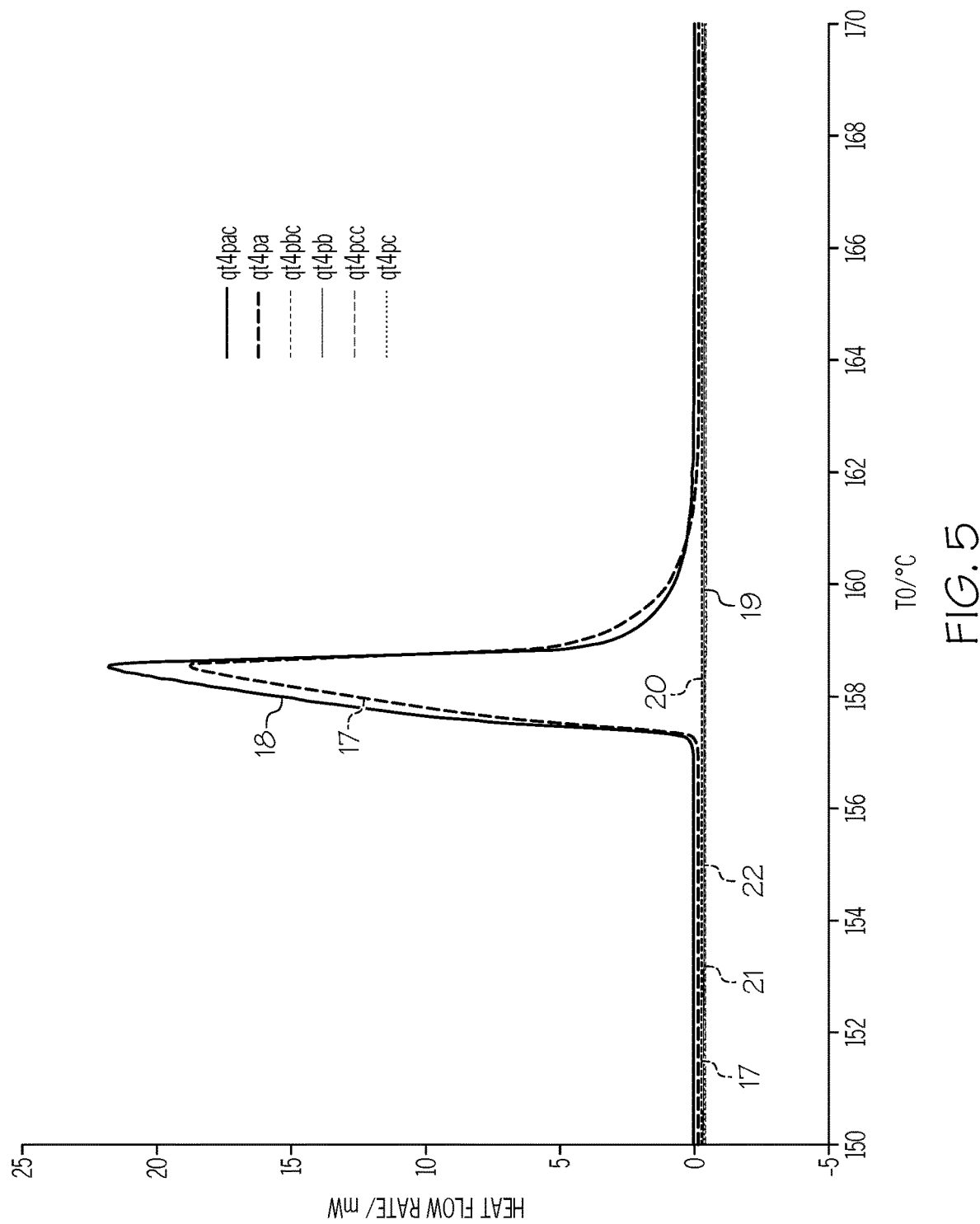
FIG. 5 is a graphical illustration of heat flow rates versus a temperature of a base of the DSC sensor of FIG. 1 according to one example.

FIG. 5 is a graphical illustration of heat flow rates versus a temperature of the base 1. The graphical illustration shows a result of a 4.865 mg indium sample in a 52.128 mg aluminum sample container on sample calorimeter unit 3 of DSC sensor 100. Empty containers having masses of 51.762 mg, 51.264 mg and 51.731 mg, respectively, are placed on the other calorimeter units 2, 4, 5. The DSC including calorimeter units 2, 3, 4 and 5 is heated at 10° C./min. The heat flow rates for the calorimeter units 3, 4, 5 were measured with both the conventional heat flow rate measurement method and the new heat flow rate measurement method that includes the heat exchange between the sample containers and the reference containers. The heat flow rates are plotted versus $T_0$, the temperature at the base 1. Heat flow rate plot 17 shows calorimeter unit 3 heat flow rate measured using the conventional method. Heat flow rate plot 18 shows calorimeter unit 3 heat flow rate measured using the new method that includes the heat exchange between the sample containers and the reference container. A latent heat of fusion of the indium sample is found by determining the area enclosed by the heat flow rate curve and a straight baseline extending from a point on the heat flow rate curve before the peak occurs to a point on the heat flow rate curve after the end of the peak. The area, determined by numerical integration with time as the abscissa, is equal to a total energy absorbed by the sample during the melt, which is divided by the sample mass to give the latent heat of fusion of the sample. The area between curve 18 and its baseline is greater than the area between curve 17 and its baseline. The latent heats of fusion were found to be 27.13 J/g using the method of the '747 patent and 28.91 J/g using the method that includes the heat exchange between the sample containers and the reference containers. Compared to the known standard value of 28.71 J/g (i.e. enthalpy of indium), the result using the new method is closer to the correct value than that of the conventional method. This difference is the result of including the heat exchange between the sample and reference containers that is not measured by calorimeter unit 3. Heat flow rate plots 19 and 20 are the heat flow rates measured by calorimeter unit 4 using the conventional method and the new method, respectively. Heat flow rate plots 21 and 22 are the heat flow rates measured by calorimeter unit 5 using the conventional method and the new method, respectively. Because the sample containers on calorimeters 4 and 5 are empty in this example, the heat flow rates measured by those two calorimeters should be undisturbed by the indium melt occurring in the sample on calorimeter unit 3, i.e. there should be no crosstalk. When plotted at the full scale of the indium melt, crosstalk is not apparent, but it does exist and may be seen by reducing the scale of the heat flow rate axis.

Figure 6:
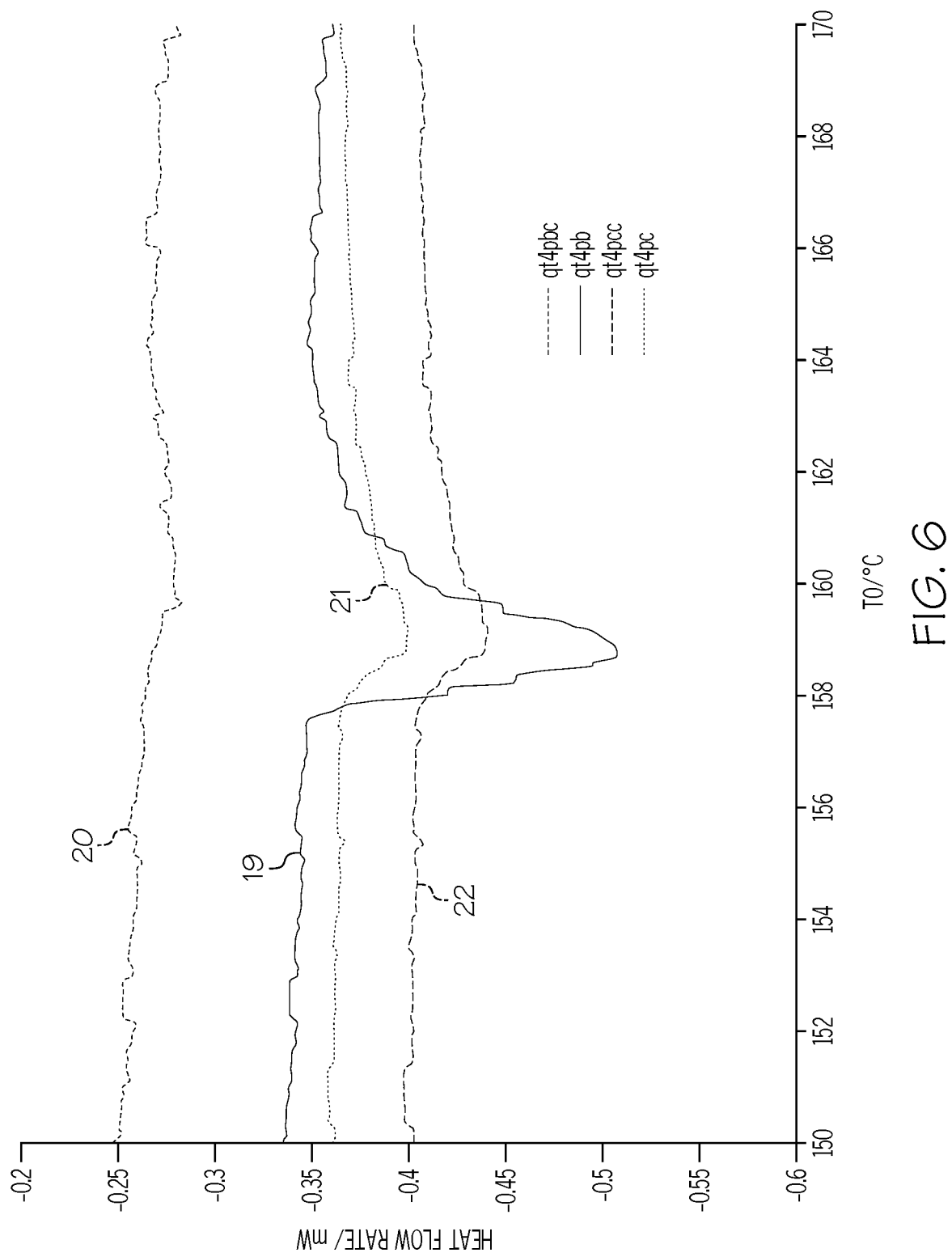
FIG. 6 is a graphical illustration of a comparison of heat flow rate measurements methods from the example of FIG. 5.

FIG. 6 is a graphical illustration of calorimeter unit 4 and calorimeter unit 5 heat flow rate measurements using the conventional method and the new method. The scale of the heat flow rate axis has been reduced to cover 400 μW versus 30 mW for the full-scale indium melt plotted in FIG. 5. Heat flow rate curve 19 represents calorimeter unit 4 heat flow rate measured using the conventional method, which shows a crosstalk peak that is −0.1664 mW high, resulting from the indium melt occurring on calorimeter unit 3. By comparison, the indium melt peak height of curve 17 in FIG. 4 is 19.255 mW, thus the crosstalk is less than 1% of the calorimeter unit 3 measurement. Heat flow rate curve 20 represents calorimeter unit 4 heat flow rate measured using the new method where heat exchange between the sample and reference calorimeter containers is included; there is no discernible crosstalk. Heat flow rate curve 21 represents the calorimeter unit 5 heat flow rate measured using the conventional method; the crosstalk peak is −0.0355 mW, which is 0.184% of the calorimeter unit 3 peak height. Heat flow rate curve 22 represents the calorimeter unit 5 heat flow rate measured using the new method and shows no discernible reduction in crosstalk. The reason the new method does not reduce crosstalk in this situation is understood by considering the relative positions of the four calorimeter units. Calorimeter units 3 and 5 are adjacent to the reference calorimeter unit 2 and calorimeter unit 4 is located opposite the reference calorimeter unit 2. Thus, the reference calorimeter unit 2 and calorimeter unit 4 are adjacent to calorimeter units 3 and 5 so that the sums of the heat exchange between containers for the reference calorimeter unit 2 and calorimeter unit 4 are nearly the same (i.e. $\dot{q}_{PR} \approx \dot{q}_{PB}$), so that when the heat flow rate difference $\dot{q}_{SB}$ is calculated, the heat transfer between sample and reference containers for calorimeter unit 4 is almost entirely cancelled by the heat transfer between sample and reference containers for the reference calorimeter unit 2 and no improvement is gained.

Figure 7:
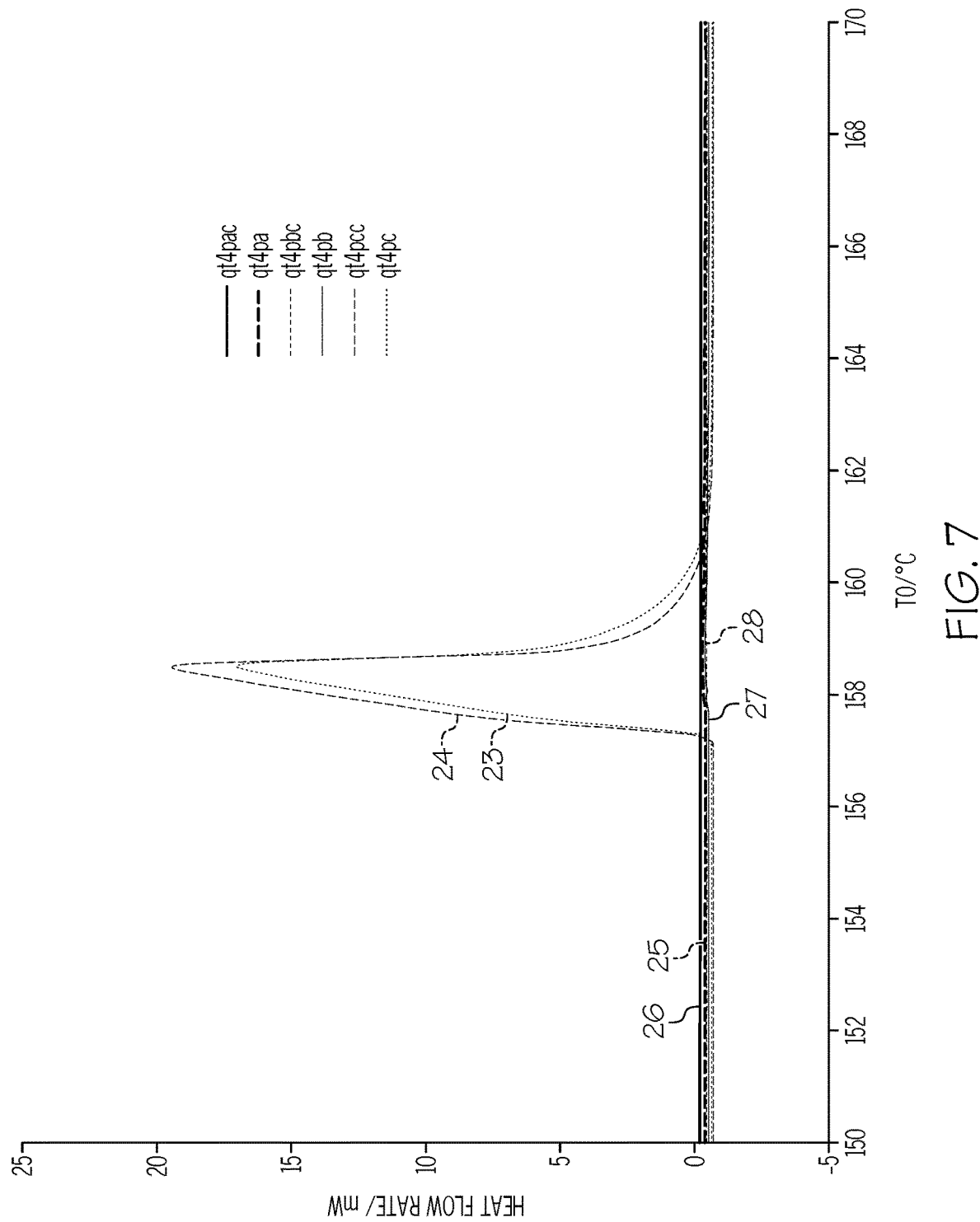
FIG. 7 is a graphical illustration of heat flow rates versus a temperature of the base of the DSC sensor of FIG. 1 according to another example.

FIG. 7 is a graphical illustration of heat flow rates versus a temperature of the base 1. The graphical illustration shows the result of a 4.865 mg indium sample in a 52.128 mg aluminum sample container on sample calorimeter unit 4 of DSC sensor 100. Empty sample containers having a mass of 52.865 mg, 51.762 mg and 51.731 mg are placed on calorimeter units 3, 5 and 2, respectively. The DSC including calorimeter units 2, 3, 4 and 5 is heated at 10° C./min. Heat flow rates for calorimeter units 3, 4, and 5 were measured with the conventional heat flow measurement and the new heat flow measurement method. The heat flow rates are plotted versus $T_0$, the temperature at the base 1. Heat flow rate plot 23 shows calorimeter unit 4 heat flow rate measured using the conventional method. Heat flow rate plot 24 shows calorimeter unit 4 heat flow rate measured using the new method. A latent heat of fusion of the indium sample is found by determining the area enclosed by the heat flow rate curve and a straight baseline extending from a point on the heat flow rate curve before the peak occurs to a point on the heat flow rate after the end of the peak. The area, determined by numerical integration with time as the abscissa, is equal to a total energy absorbed by the sample during the melt, which is divided by the sample mass to give the latent heat of fusion of the sample. The area between curve 24 and its baseline is greater than the area between curve 23 and its baseline. The latent heats of fusion were found to be 26.75 J/g using the conventional method and 28.27 J/g using the new. Compared to the known standard value of 28.71 J/g (i.e. enthalpy of indium), the new method is much closer to the correct value than that of the conventional method. This difference is the result of including the heat exchange between the sample and reference containers that is not measured by calorimeter unit 4. Heat flow rate plots 25 and 26 are the heat flow rates measured by calorimeter unit 3 A using the conventional method and the new method, respectively. Heat flow rate plots 27 and 28 are the heat flow rates measured by calorimeter unit 5 using the conventional method and the new method, respectively. Because the sample containers on calorimeter units 3 and 5 are empty, the heat flow rates measured by those two calorimeters should be undisturbed by the indium melt occurring in the sample on calorimeter unit 4, i.e. there should be no crosstalk. When plotted at the full-scale of the indium melt, crosstalk is small but is noticeable, and may be seen by reducing the scale of the heat flow rate axis.

Figure 8:
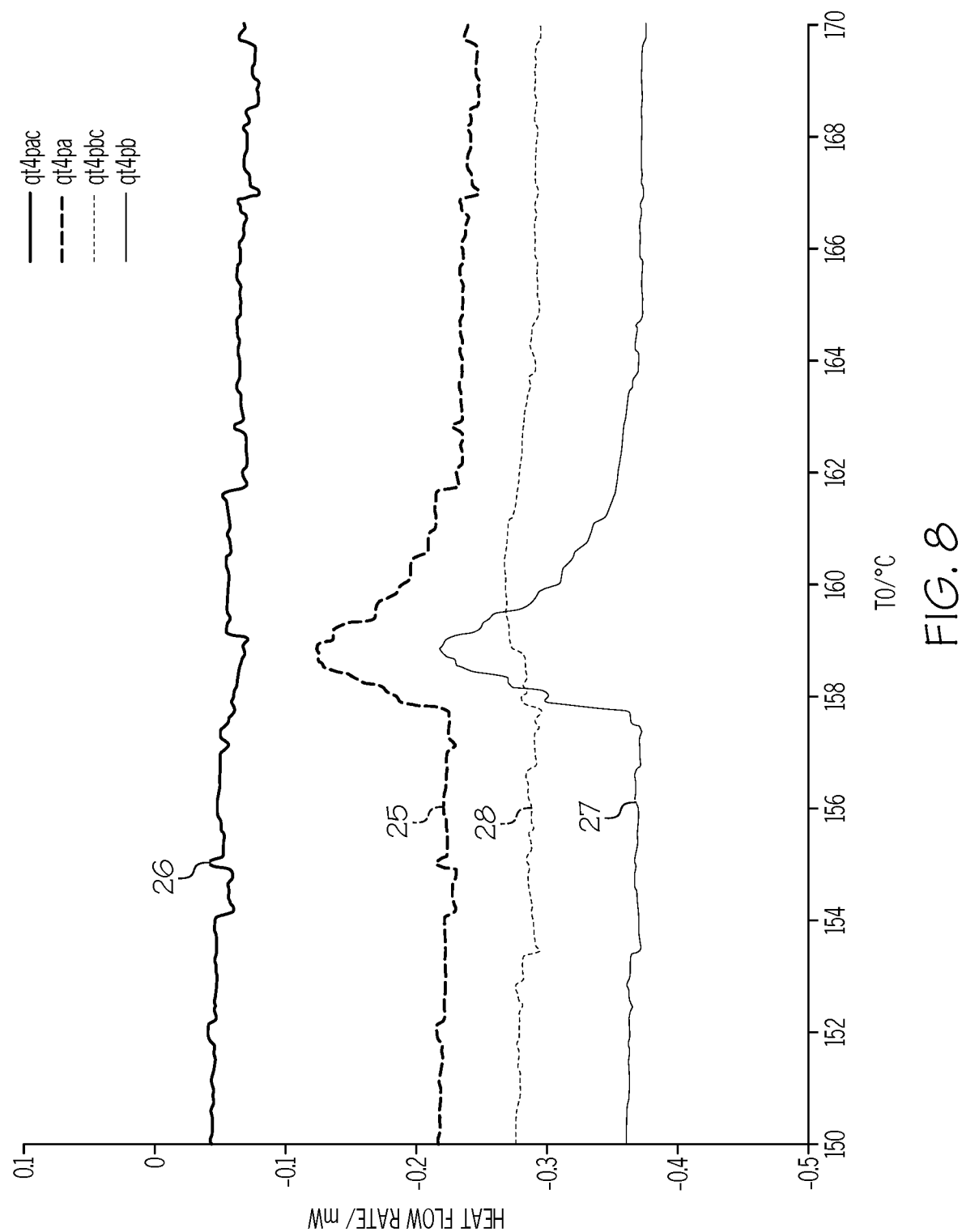
FIG. 8 is a graphical illustration of a comparison of heat flow rate measurements methods from the example in FIG. 7

FIG. 8 is a graphical illustration of the calorimeter unit 3 and 5 heat flow rate measurements using the conventional method and the new method. The scale of the heat flow rate axis has been reduced to cover 600 μW versus 30 mW for the full indium melt plotted in FIG. 7. Heat flow rate curve 25 is the heat flow rate measured by calorimeter unit 3 using the conventional method, which shows a crosstalk peak that is 0.0989 mW high, resulting from the indium melt on calorimeter unit. By comparison, the indium melt peak height of curve 23 in FIG. 7 is 18.192 mW, thus the crosstalk is of the order of 0.5% of the calorimeter unit 4 measurement. Heat flow rate curve 26 is the heat flow rate measured by calorimeter unit 3 using the new method; there is no discernible crosstalk. Heat flow rate curve 27 is the calorimeter unit 5 heat flow rate measured using the conventional method, and the crosstalk peak is 0.148 mW. The crosstalk peak is 0.813% of the calorimeter unit 4 peak height. Heat flow rate curve 28 is the heat flow rate measured by calorimeter unit 5 using the new method, and shows a crosstalk peak of 0.014 mW, an order of magnitude reduction in crosstalk. In this case, the crosstalk peaks measured by calorimeter units 3 and 5 using the conventional method are similar in magnitude and shape. Calorimeter unit 4 that has the indium sample is opposite the reference calorimeter unit 2 and adjacent to calorimeter units 3 and 5. Thus, the calorimeter unit 3 and 5 crosstalk signals are nearly the same because of their mirror image locations with respect to the reference calorimeter unit 2 and calorimeter unit 5. In this situation $\dot{q}_{PA}$ and $\dot{q}_{PB}$ are larger than $\dot{q}_{PR}$ and the crosstalk peak is nearly eliminated when the heat exchanges between sample and reference containers are included in the container heat flow summations $\dot{q}_{SA}$ and $\dot{q}_{SB}$.

Figure 9:
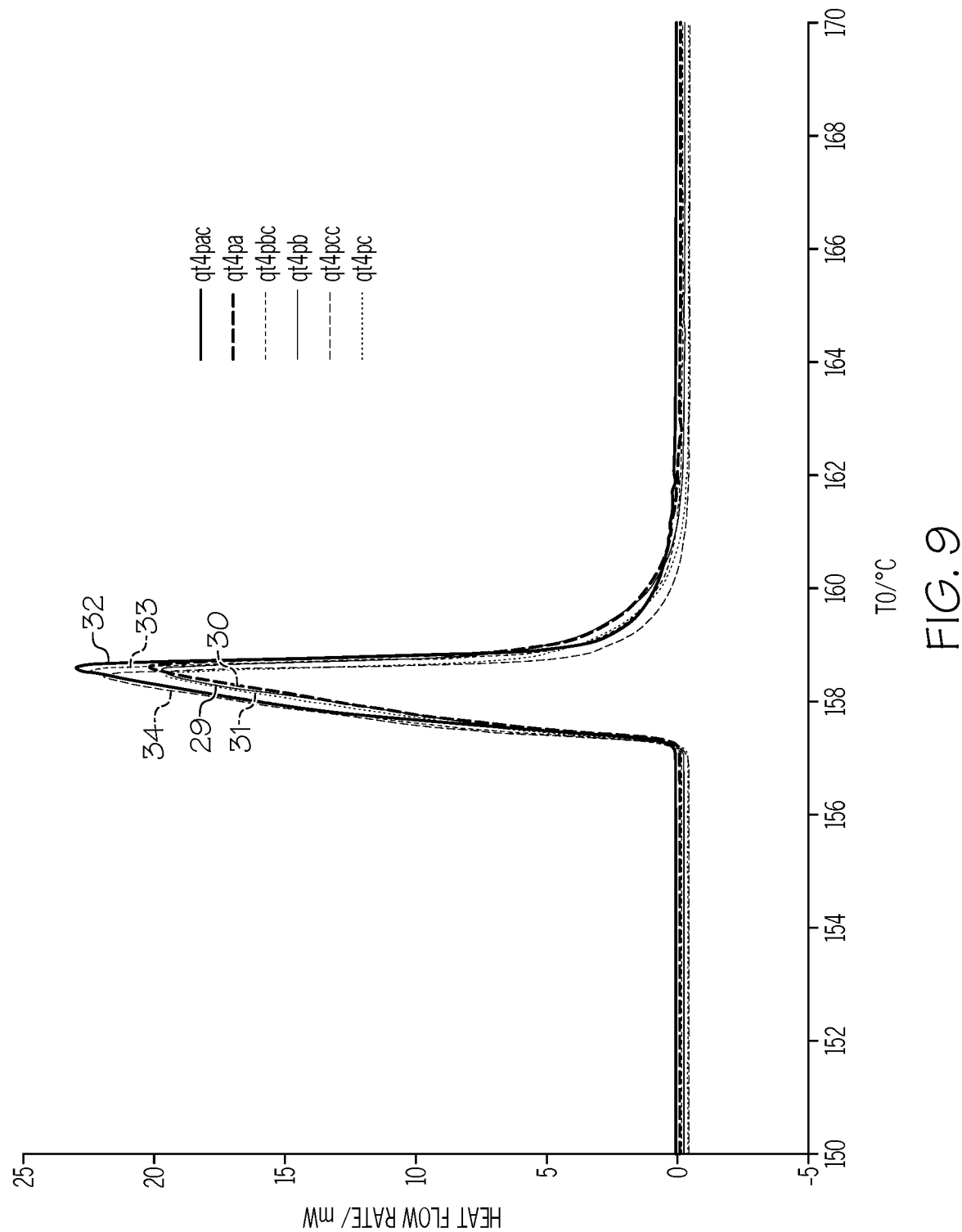
FIG. 9 is a graphical illustration of a result of a three-sample DSC experiment performed in the four-calorimeter DSC sensor of FIG. 1, according to another example.

FIG. 9 is a graphical illustration of a result of a three-sample DSC experiment performed using the four-calorimeter DSC sensor 100. A 5.288 mg indium sample in a 51.576 mg aluminum sample container was installed on calorimeter unit 3, a 5.300 mg indium sample in a 51.608 mg aluminum sample container was installed on calorimeter unit 4, a 5.080 mg indium sample in a 52.258 mg aluminum sample container was installed on calorimeter unit 5, and an empty 51.731 mg aluminum sample container was installed on the reference calorimeter unit 2. The DSC including calorimeter units 2, 3, 4 and 5 was heated at 10° C./min and the heat flow rates were measured according to the conventional method and the new method. Heat flow rate curves 29, 30 and 31 are sample A, sample B and sample C heat flow rates measured using the method of the '747 patent. Heat flow rate curves 32, 33 and 34 are the heat flow rates measured by calorimeter units 3, 4, and 5 using the new method. Heats of fusion for samples associated with calorimeter units 3, 4, and 5 measured using the conventional method of are: 27.23 J/g, 27.17 J/g and 26.94 J/g. Heats of fusion for samples associated with calorimeter units 3, 4, and 5 measured using the new method are: 29.373 J/g, 29.29 J/g and 28.05 J/g. All values of latent heat of fusion measured using the new method are much closer to the correct known standard value of 28.71 J/g than those measured using the conventional method. The improvement is the result of including the heat exchange among the sample and reference containers in the heat flow rate measurement summations.

While this disclosure has been described in conjunction with the specific embodiments outlined above, it is evident that many alternatives, modifications and variations will be apparent to those skilled in the art. Accordingly, the preferred embodiments of the present disclosure as set forth above are intended to be illustrative, not limiting. Various changes may be made without departing from the scope of the invention, as defined by the following claims. The claims provide the scope of the coverage of the invention and should not be limited to the specific examples provided herein.

What is claimed is:

1. A heat flow rate measurement method for use with a differential scanning calorimeter sensor, the method comprising:

calculating a heat exchange between a plurality of sample containers and a reference container placed on a plurality of sample calorimeter units and a reference calorimeter unit, respectively, wherein a distance between a first sample container on a first sample calorimeter unit and a second sample container on a second sample calorimeter unit is greater than a distance between the first sample container and a third sample container on a third sample calorimeter; and determining a heat flow rate of samples within the sample containers using the calculated heat exchange between the plurality of sample containers and the reference container.

2. The heat flow rate measurement method of claim 1, wherein calculating the heat exchange between the sample containers and the reference container includes calculating a sum of heat exchanges between the sample containers and the reference container for each calorimeter unit.

3. The heat flow rate measurement method of claim 1, wherein the heat exchanged between the sample containers and the reference container is determined according to:

$$\dot{q}_{PA}=((T_{PB}-T_{PA})/R_{AB})+((T_{PC}-T_{PA})/R_{AC})+\ldots+(T_{Pn}-T_{PA})/(R_{An}+((T_{PR}-T_{PA})/R_{AR});$$

$$\dot{q}_{PB}=((T_{PA}-T_{PB})/R_{AB})+((T_{PC}-T_{PB})/R_{BC})+\ldots+((T_{Pn}-T_{PB})/R_{Bn})((T_{PR}-T_{PB})/R_{BR});$$

$$\dot{q}_{PC}=((T_{PA}-T_{PC})/R_{AC})+((T_{PB}-T_{PC})/R_{BC})+\ldots+((T_{Pn}-T_{PC})/R_{Cn})+((T_{PR}-T_{PC})/R_{CR});\text{ and}$$

$$\dot{q}_{Pn}=((T_{PA}-T_{Pn})/R_{An})+((T_{PB}-T_{Pn})/R_{Bn})+\ldots((T_{Pn-1}-T_{Pn})/R_{(n-1)n})+((T_{PR}-T_{Pn})/R_{nR}),$$

wherein $T_{PA}$ is a temperature of the first sample container, $T_{PB}$ is a temperature of the second sample container, $R_{AB}$ is a thermal resistance between the first sample container and the second sample container, $T_{PC}$ is a temperature of the third sample container, $R_{AC}$ is a thermal resistance between the first sample container and the third sample container, $T_{Pn}$ is a temperature of a nth sample container, $R_{An}$ is a thermal resistance between the first sample container and the nth sample container, $T_{PR}$ is a temperature of the reference container, and $R_{AR}$ is a thermal resistance between the first sample container and the reference container.

4. The heat flow rate measurement method of claim 3, wherein the heat flow rate of the first sample is determined according to:

$$\dot{q}_{SA}=\dot{q}_A+\dot{q}_{PA}-((m_{PA}\dot{T}_{PA})/(m_{PR}\dot{T}_{PR}))*(\dot{q}_R+\dot{q}_{PR}),$$

wherein $\dot{q}_A$ is a heat flow rate of the first calorimeter unit, $\dot{q}_{PA}$ is the heat exchanged between the first sample container and the second sample container, the third sample container, through the nth sample containers and the reference container, $m_{PA}$ is a mass of the first sample container, $\dot{T}_{PA}$ is a derivative of temperature with respect to time of the first sample container, $m_{PR}$ is a mass of the reference container, $\dot{T}_{PR}$ is a derivative of temperature with respect to time of the reference container, $\dot{q}_R$ is a heat flow rate of the reference calorimeter unit, $\dot{q}_{PR}$ is the heat exchanged between the reference container and the first sample container, the second sample container, the third sample container through the nth sample containers.

5. The heat flow rate measurement method of claim 1, further comprising
heating a base of a differential scanning calorimeter sensor, wherein the plurality of sample calorimeter units and the reference calorimeter unit are arranged on the base; and
measuring a temperature of the calorimeter units using a plurality of thermocouples formed by electrical junctions between a platform and a detector of each calorimeter unit.

6. The heat flow rate measurement method of claim 5, further comprising: calculating a heat flow rate for the calorimeter units using the temperature of the calorimeter units, the heat flow rate for the calorimeter units being equal to a heat flowing through thermal contact resistances between the calorimeter units and sample containers placed on the calorimeter units.

7. The heat flow rate measurement method of claim 1, wherein the heat exchanged between the plurality of sample containers and the reference container is by at least one of conduction through a gas within a calorimetric enclosure of the differential scanning calorimeter sensor, convection by the gas, and by radiation between surfaces of the sample containers and the reference container.

8. A multiple sample differential scanning calorimeter sensor, comprising:
a first sample calorimeter unit attached to a base and configured to receive a first sample container;
a second sample calorimeter unit attached to the base and configured to receive a second sample container;
a third sample calorimeter unit attached to the base and configured to receive a third sample container, wherein a distance between the first sample container on the first sample calorimeter unit and the second sample container on the second sample calorimeter unit is greater than a distance between the first sample container and the third sample container on the third sample calorimeter unit; and
a reference calorimeter unit attached to the base and configured to receive a reference container;
wherein heat exchanged between the first sample container, the second sample container, the third sample container, and the reference container is measured as a function of determining a heat flow measurement of heat flowing to and from a sample in the first sample container.

9. The multiple sample differential scanning calorimeter sensor of claim 8, further comprising a plurality of sample area thermocouples for measuring temperature differences between the sample calorimeter units and the base, the sample area thermocouples formed by a detector connected to an underside of a platform of the sample calorimeter units.

10. The multiple sample differential scanning calorimeter sensor of claim 8, further comprising a reference area thermocouple for measuring a temperature difference between the reference calorimeter unit and the base, the reference area thermocouple formed by a detector connected to an underside of a platform of the reference calorimeter.

11. The multiple sample differential scanning calorimeter sensor of claim 8, further comprising installation elements that secure a positive thermocouple wire and a negative thermocouple wire to the base that form a base thermocouple for measuring a temperature of the base.

12. The multiple sample differential scanning calorimeter sensor of claim 8, wherein the heat exchanged between the first sample container, the second sample container, the third sample container, and the reference container is determined according to:

$$\dot{q}_{PA}=((T_{PB}-T_{PA})/R_{AB})+((T_{PC}-T_{PA})/R_{AC}+((T_{PR}-T_{PA})/R_{AR})$$

$$\dot{q}_{PB}=((T_{PA}-T_{PB})/R_{AB})+((T_{PC}-T_{PB})/R_{BC})+((T_{PR}-T_{PB})/R_{BR});\text{ and}$$

$$\dot{q}_{PC}=((T_{PA}-T_{PC})/R_{AC})+((T_{PB}-T_{PC})/R_{BC})+((T_{PR}-T_{PC})/R_{CR}),$$

wherein $T_{PA}$ is a temperature of the first sample container, $T_{PB}$ is a temperature of the second sample container, $R_{AB}$ is a thermal resistance between the first sample container and the second sample container, $T_{PC}$ is a temperature of the third sample container, RAG is a thermal resistance between the first sample container and the third sample container, $T_{PR}$ is a temperature of the reference container, $R_{AR}$ is a thermal resistance between the first sample container and the reference container, $R_{BC}$ is a thermal resistance between the second sample container and the third sample container, $R_{BR}$ is a thermal resistance between the second sample container and the reference container, and $R_{CR}$ is a thermal resistance between the third sample container and the reference container.

13. The multiple sample differential scanning calorimeter sensor of claim 12, wherein the heat flow measurement of heat flowing to and from the first sample in the first sample container is determined according to:

$$\dot{q}_{SA} = \dot{q}_A + \dot{q}_{PA} - ((m_{PA}\dot{T}_{PA})/(m_{PR}\dot{T}_{PR}))*(\dot{q}_R + \dot{q}_{PR})$$

wherein $\dot{q}_A$ is a heat flow rate of the first calorimeter unit, $\dot{q}_{PA}$ is the heat exchanged between the first sample container and the second sample container, the third sample container, and the reference container, $m_{PA}$ is a mass of the first sample container, $\dot{T}_{PA}$ is a derivative of temperature with respect to time of the first sample container, $m_{PR}$ is a mass of the reference container, $\dot{T}_{PR}$ is a derivative of temperature with respect to time of the reference container, $\dot{q}_R$ is a heat flow rate of the reference calorimeter unit, $\dot{q}_{PR}$ is the heat exchanged between the reference container and the first sample container, the second sample container, and the third sample container.

14. The multiple sample differential scanning calorimeter sensor of claim 8, wherein the heat exchanged between the plurality of sample containers and the reference container is by at least one of conduction through a gas within a calorimetric enclosure of the differential scanning calorimeter sensor, convection by the gas, and by radiation between surfaces of the sample containers and the reference container.

* * * * *